United States Patent [19]

Link

[11] Patent Number: 5,147,152
[45] Date of Patent: Sep. 15, 1992

[54] PNEUMATIC SUCTION CONVEYOR MEANS FOR THE GRAVIMETRIC DOSING OF BULK MATERIAL COMPONENTS

[75] Inventor: Otmar Link, Buchen-Götzingen, Fed. Rep. of Germany

[73] Assignee: AZO GmbH & Co., Osterburken, Fed. Rep. of Germany

[21] Appl. No.: 599,021

[22] Filed: Oct. 17, 1990

[30] Foreign Application Priority Data

Oct. 20, 1989 [DE] Fed. Rep. of Germany ....... 3934910

[51] Int. Cl.⁵ ............................................. B65G 53/24
[52] U.S. Cl. ........................................ 406/1; 406/21; 406/22; 406/28; 406/33; 406/120; 406/156; 406/173
[58] Field of Search .................... 406/1, 21, 22, 28, 33, 406/120, 123, 156, 169, 173, 174, 182

[56] References Cited

U.S. PATENT DOCUMENTS

| 2,572,862 | 10/1951 | Israel | 406/156 X |
| 3,077,365 | 2/1963 | Fisher | 406/120 X |
| 3,265,327 | 8/1966 | Mach | 406/182 |
| 3,307,646 | 3/1967 | Hage | 406/156 X |

FOREIGN PATENT DOCUMENTS

| 127317 | 5/1990 | Japan | 406/120 |
| 503729 | 4/1939 | United Kingdom | 406/1 |

Primary Examiner—Margaret A. Focarino
Assistant Examiner—Andrew C. Pike
Attorney, Agent, or Firm—Antonelli, Terry, Stout & Kraus

[57] ABSTRACT

A suction conveyor or delivery arrangement for the gravimetric allocation of pourable material components to several demand stations has a storage container containing in each case one component connected by, in each case, one delivery line to a distributor and a separator at each demand station, which is connected via a delivery line to the distributor, a suction line with stop valve to a suction fan and can be emptied via a closable discharge opening at the demand station. A control for the demand-dependent dosing of the components has a demand indicator, which releases a control signal for setting the distributor to the desired component and for opening the stop valve, as well as a setting device which, on reaching a predetermined quantity, releases a control signal for opening a ventilating valve in the delivery line and for closing the stop valve. Each separator has two chambers, whereof the lower chamber has the closable discharge opening, while the upper chamber has connections for the delivery line, the suction line and below the same a weighing container receiving the separated material and supported by a transducer and which has a material outlet and a closure, which is closed when the demand indicator response and is opened in time-delayed manner when the setting device activated by the transducer responds.

13 Claims, 2 Drawing Sheets

PNEUMATIC SUCTION CONVEYOR MEANS FOR THE GRAVIMETRIC DOSING OF BULK MATERIAL COMPONENTS

FIELD OF THE INVENTION

The present invention relates to a pneumatic suction conveyor means for gravimetric dosing of different pourable material components to a plurality of demand stations.

BACKGROUND OF THE INVENTION

Pneumatic suction conveyor means for gravimetric dosing of different components have been proposed which include a plurality of storage containers each containing one component, with the storage containers being respectively connected by one delivery line to a distributor. A separator is provided at each demand station, with the separator being connected by a delivery line to the distributor, and a suction line with a stop valve is connected to a suction fan. The separators are emptiable by a closable discharge opening, and a control is provided for a demand-dependent dosing of the components to the demand stations, with each demand station including a demand indicator for providing a control signal for adjusting the distributor to a desired component and for opening the stop valve. A setting device, upon reaching a predetermined quantity of material, releases a control signal for opening a ventilating valve in the delivery line and a set time delay is provided for closing the stop valve.

Suction conveyors of the aforementioned type are used in numerous different ways in material treatment and processing. A typical use is the processing of plastic granules in injection molding machines, extruders, etc., to shape and mold plastic parts or intermediate products. The plastic granules are conveyed from storage containers to the individual demand stations, namely, the injection molding machines, in a pneumatic manner and must be separated at the machine from the feed flow. As a result of the variety of plastics to be processed, which differ with respect to their chemical structure, physical characteristics, and/or required processing, such plastics may not be mixed with one another and, consequently, such plastic processing installations have a plurality of storage containers, each respectively receiving a specific material component. Depending upon the size of the plant, the sixty or more injection molding machines may have to be employed and supplied with material. In order to permit the continuous operation of all of the injection molding machines, a pneumatic suction conveyor system is used for supply purposes, with the conveyor system being designed in such a manner that at the demand station or each machine a specific supply of material is maintained in a ready state and is supplemented as rapidly as possible when the quantity of material drops below a specific amount. This requires a constant alternation of connections and disconnections of the individual separators with respect to the injection molding machines.

To this end, the respective storage containers are connected by one delivery line to a distributor which, in turn, is connected by a delivery line with the separator at one of the demand stations. All or a large proportion of the separators are connected via stop valves to a joint suction line with a single suction blower. By virtue of the provision of the distributor it is possible to connect each delivery line coming from one of the storage containers to one of the delivery lines leading to the separators, so that each demand station can be supplied with each of the components present.

In order to store the desired quantity of material at the demand station, an empty indicator is positioned at the demand station and responds is an inadequate quantity of material is available. As a result of the response of the empty indicator, the distributor is switched to the corresponding component and the stop valve to the suction line is opened, so that the corresponding component is conveyed into the separator and from the separator passes to the demand station. When the necessary storage quantity is reached, then a setting device or full indicator scanning the material level responds, which closes the stop valve to the suction line in a manner described, for example, in DE-AS 26 14 713 and DE-OS 21 36 328.

It is also possible to remove the separator from the feed flow by closing the inlet side of the delivery line in a manner described, for example, in U.S. Pat. No. 3,386,773, although this proposal presupposes an additional ventilation of the separator in order to be able to transfer the material to the demand station.

If the full indicator responds, that is, material volume desired at the consumer means is present, then the complete delivery line between the storage container and the separator is still full of material. As the next consumer means connected in the delivery sequence generally requires a different material, it is at least necessary to suction empty the delivery line between the distributor and the separator at the end of each delivery cycle, so that undesired mixing and material supplies to a demand station do not occur. Empty suctioning is also recommended if it is necessary to cover long delivery distance, because the material settling in the case of a brief conveying interruption may lead to clogging and starting difficulties. Such residual fractions or "tailings" still present in the lines varies in magnitude as a result of the different delivery paths between the individual storage containers and the demand stations. When the full indicator responds through opening a ventilation valve in the delivery line, the residual fraction or tailings is conveyed into the separator and is separated from the feed air. The residual fractions are added to the quantity volumetrically determined or detected by the full indicator and, consequently, at each demand station, as a function of the component conveyed, that is, for example, a distance from the storage container, different stored quantities are kept available.

In installations of the aforementioned type, it is necessary to accurately know the individual quantities removed from a demand station and processed and the total quantity removed over a specific period of time, so as to permit a completely satisfactory planning and cost analysis.

Up to now the problem of accurately determining the individual quantities removed from a demand station in plants having a large number of storage containers and consuming means has been solved by adding an average quantity representing all conceivable residual fraction quantities to the relatively precisely determinable volume reached in response to the full indicator so that conclusions can be drawn with respect to the processed material volume from each delivery cycle during which the manned station has been supplied. This method is naturally imprecise and can only lead to approximate statistical. results if each demand station removes each material component in statistically constant levels. This prerequisite is only fulfilled in few cases. Moreover, the larger the plant, the less representative this volume supplement.

When supplying a single demand station with several components, it is readily possible to supply precisely determined quantities because, in this case, the delivery line is closed or ventilated immediately upstream of the separator and the material can remain in the delivery line in the manner described, for example, in DE-OS 25 28 518. However, this method fails when there are several demand stations, which are to be supplied from the same storage containers.

It is also not possible with known plants or installations to permit gravimetric dosing which enables a more precise determination of consumption.

SUMMARY OF THE INVENTION:

The aim underlying the present invention essentially resides in providing an arrangement for permitting a gravimetric precise dosing of material components to all the demand stations and, consequently, make it possible to establish a value of the material consumption at each demand station for each delivery cycle or over a long period of time on the basis of a number of delivery cycles.

In accordance with advantageous features of the present invention, each separator comprises an upper chamber and a lower chamber, with the lower chamber having a closable discharge opening and the upper chamber being connected to the delivery line and the suction line. A weighing container is disposed below the separator and is supported by a transducer, with the weighing container receiving the separated material from the separator. The upper chamber has a bottom-side material outlet for discharging material into the lower chamber and a closure which, when the demand indicator responds, can be brought into a closed position and, when the setting device activated by the transducer responds, can be brought, with a set time delay, into the open position.

The suction conveyor means according to the invention functions as follows. If the material supply present at the demand station has been consumed except for a residual quantity, the demand indicator closes the closure at the material outlet of a weighing container and opens the stop valve in the suction line. Previously the distributor is set to the delivery line of the particular storage container containing the desired component and the feed or delivery cycle commences. The delivered component is separated in an upper chamber from the delivery flow and passes into the weighing container, which forms a part of the upper chamber. If the quantity in the weighing container reaches the weight set on the setting device, then the delivery of material is interrupted by opening the ventilating valve controlled by the setting device, so that the material still present in the line, for example, the tailings, passes into the weighing container and is measured by the transducer. With a preset time delay or time lag, the ventilating valve and the stop valve are closed and the closure at the weighing container is opened so that the precisely weighed quantity of material passes into the lower chamber and, with the discharge opening open, reaches the demand station.

The time lag for closing the ventilating valve can be preset as an empirically established absolute value for the complete weighing process. However, the control signal opening the ventilating valve can be applied until the transducer no longer records any weight change and then, with a short time lag, the ventilating valve and the stop valve may be closed and the closure opened. In this manner it is ensured that the precise weight can be established for each delivery cycle and, by a balance storage container, the weight of material removed over a longer period of time at each delivery station can also be established.

As the closure associated with the discharge opening of the lower chamber can be constructed in a conventional manner, advantageously, the discharge opening is directed towards the side and is closed by a hinge or swinging flap, because this is the easiest possible manner of avoiding the jamming of material between the flap and the opening edge. The flap can be forcibly controlled or as is also known and preferred, can be constructed as a pendulum flap, which is maintained in the open position for as long as the material is in its movement region and only when this material has completely flowed past the pendulum flap is the pendulum flap automatically closed and, upon closing, activates the demand indicator. A pendulum flap of this type automatically closes under the effects of gravity and has the advantage of being of particularly simply construction. During the delivery process, which is started by a closing movement of the pendulum flap and the resulting activation of the empty indicator, the pendulum flap is moved near the discharge opening by a vacuum action.

According to further features of the present invention, the closing device for the material outlet of the weighing container is a baffle, which merely holds back the material, but does not separate the chambers in an airtight manner. Thus, between the upper and lower chambers and, specifically through the outlet thereof, a pneumatic open connection is provided, so that during subsequent suctioning of the tailings the pendulum flap is maintained in a closed position by the vacuum. However, the baffle holds back the material located in the weighing container. Between the upper and lower chambers there can also be an open connection outside the weighing container. If the stop valve is closed to the suction line and the vacuum in the separator collapses, then ventilation takes place through the closure of the lower chamber and, after opening the weighing container closure, the pendulum flap can open by the weight of the falling material, so that the measured material volume can reach the demand station. The pendulum flap then remains open for as long as their is material in the lower chamber of the separator and only closes when it becomes free from material located below the discharge opening at the demand station.

Advantageously, the baffle is a baffle plate moved at a limited distance below the material outlet. The spacing and covering of the discharge opening by the baffle plate ar chosen in such a manner that the material held back in the upper chamber or in the weighing container cannot pass under its own gravity through the gap. However, the upper and lower chambers are pneumatically connected.

In a simple variation, the upper chamber comprises the actual separating zone, with the weighing container being located below the upper chamber. The separating zone has a conical transition piece projecting into an open top end of the weighing container. In this manner the weighing container can be disengaged from the separating zone, so that the weighing container or the transducer can record the actual weight in an uninfluenced manner. For example, the weighing container can be supported by the transducer on a wall of the separator.

According to a further embodiment of the present invention, the weighing container is associated with a mounting support for the baffle plate located at its outlet, so that the baffle plate follows the movements of the weighing container and an always constant association of the baffle plate and the material outlet at the weighing container, that is, a constant gap width, is ensured.

The baffle plate is advantageously associated with a drive, which, for example, may be fixed to the inside of the separator and be in operative connection with the baffle plate by a coupling not influencing the weighing container.

It is also possible to arrange the drive directly on the weighing container. However, the first-mentioned construction is more favorable in that it allows a simpler disassembly of the weighing container, for example, for cleaning purposes.

A particularly favorable construction from cost and space standpoints is characterized in that the separator is formed by a substantially cylindrical container which, in its upper area, has the upper chamber with the separating zone and the weighing container, which is concentrically inserted in the separator container and below the same has the lower chamber.

It is also advantageous if the lower chamber has a hopper bottom inserted in the separator container and which is closed at a lower end thereof by the pendulum flap which allows a discharge of material only under the effects of gravity.

In accordance with still further features of the present invention, the distributor includes a tubular routing or deflecting means which selectively connects one of the delivery lines from the storage containers to one of the delivery lines leading to the separators, with a single ventilating valve being located at an inlet of the tubular routing or deflecting means.

This construction has the advantage that the tailings, still present following the response of the setting device, are limited or confined to that part of the delivery line located between the distributor and the separator. This makes it possible to minimize the volume required in the separator for receiving the tailings. However, the delivery system is still suctioned empty to the extent required for avoiding undesired mixing and dosing. However, the material present in the delivery lines between the storage containers and the distributor is deposited in the lines. This has the advantage that, at the start of the delivery cycle, the delivery lines do not have to be filled and instead the material relatively rapidly becomes available at the separator. The essential advantage compared with the conventional means having ventilating valves directly in the vicinity of each storage container resides in the fact that only a single ventilating valve is required, which makes it possible to significantly reduce manufacturing and assembling costs, especially when there are a large number of storage containers. There is also a reduction in possible operational problems and necessary inspections as compared with a construction provided with a plurality of ventilating valves.

BRIEF DESCRIPTION OF THE DRAWINGS:

The invention is described in greater detail hereinafter relative to non-limitative embodiments and the attached drawings, wherein.

Figure 1:
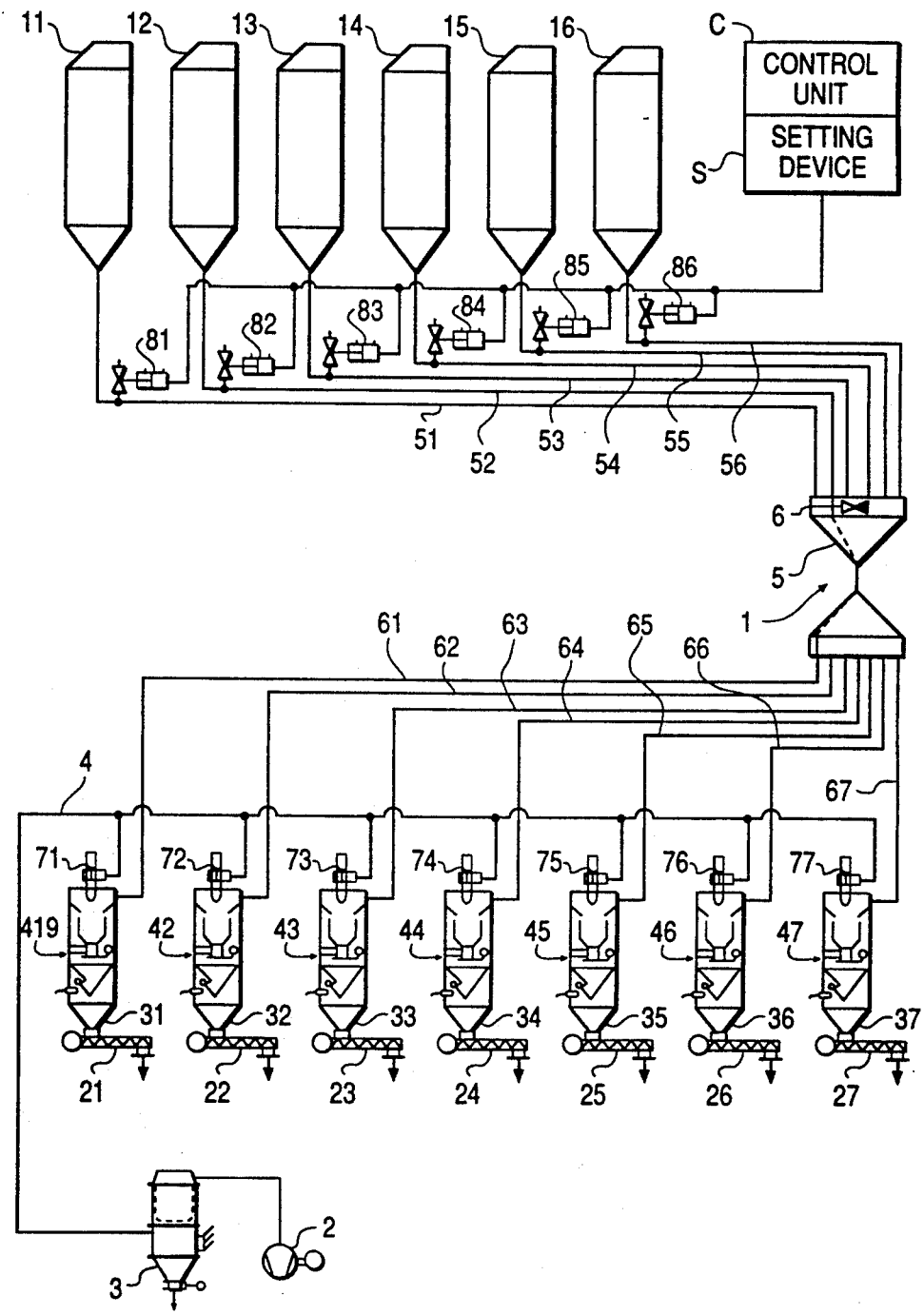
FIG. 1 is a schematic view of a suction conveyor means constructed in accordance with the present invention.

DETAILED DESCRIPTION:

The suction conveyor means of the present invention shown in the drawings has several storage containers 11, 12, 13, 14, 15, and 16, i.e. a total of six containers, each of which contains a specific material component. The containers 11 to 16 supply several, in the illustrated embodiment, seven consuming means 21 to 27. In the present case, the suction conveyor means is employed in a plastics processing plant, in which each of the storage containers 11 to 16 contain a granular material having a different chemical composition and/or different physical characteristics, and the consuming means 21 to 27 are constructed as extruders plasticizing the granular material. A feed container 31 to 37, in the form of a feed hopper, is associated with each of the consuming means 21 to 27, with a separator 41 to 47 being respectively located on each feed container 31 to 37.

A distributor 1, in the form of a tubular deflecting or routing means, is provided between the storage containers 11 to 16 and the separators 41 to 47. Each container 11 to 16 is respectively connected to a delivery line 51 to 56 to the inlet of the distributor 1, and each separator 41 to 47 is respectively connected, by a delivery line 61 to 67, to the outlet of the distributor 1. At the end of the delivery section is positioned a suction fan 2 with an upstream-positioned separator 3, to which the separators 41 to 47 are connected by a suction line 4. Stop valves 71 to 77 are respectively positioned between each separator 41 to 47 and the suction line 4. Moreover, in the illustrated embodiment, ventilating valves 81 to 86 are respectively associated with each feed line 51 to 56 from the respective containers 11 to 16.

Each separator 41 to 47 includes a conical bottom 410 with a discharge opening 411 directed towards the side, with the discharge opening 411 being adapted to be closed by a pendulum flap 412. The pendulum flap 412 is closable by gravity and is located in the respective feed containers 31 to 37. As long as vacuum prevails in the respective separators 41 to 47, the pendulum flap 412 is drawn near the edge of the discharge opening 411. Conversely, as long as material is present between the respective separators 41 to 47 and the associated feed containers 11 to 16, the pendulum flap 412 is urged into the open position for enabling a delivery of the material. An empty indicator 413 is associated with the respective pendulum flaps 412, with the indicator 413 providing a response when the material completely frees the pendulum flap 412 and the pendulum flap 412 has moved into the closed position. At this instance the stop valves 71 to 77 associated with the respective separators 41 to 47 are opened, the vacuum in the separator and in the associated feed line is built up, and the material component is delivered from one of the storage containers 11 to 16 into the separator.

Figure 2:
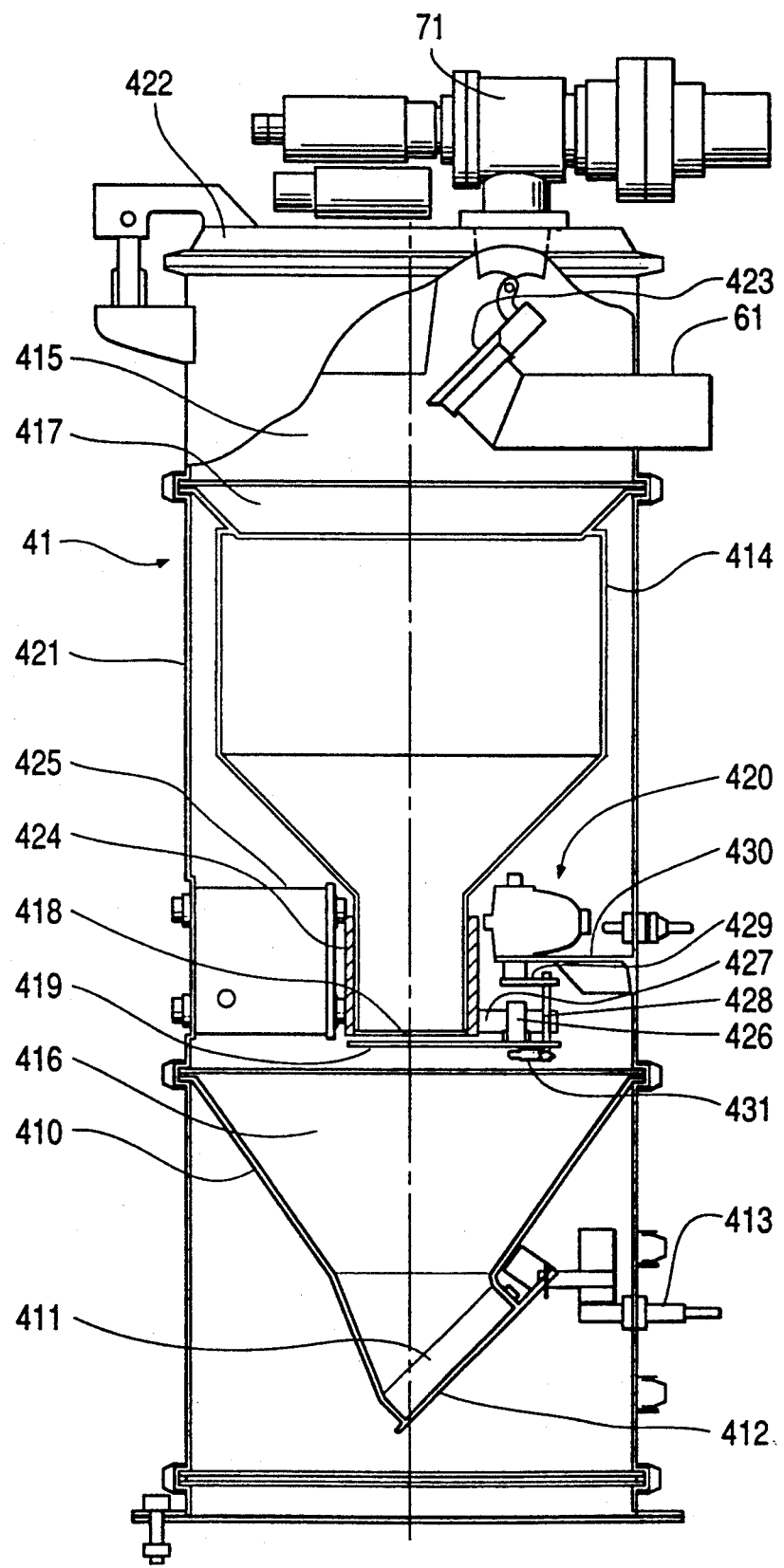
FIG. 2 is a section view through a separator of the suction conveyor means of the present invention on an enlarged scale.

As exemplified by the separator 41 in FIG. 2, each separator 41 to 47 comprises an upper and lower chamber 415, 416. The delivery line 61 to 67 and the suction line 4 are connected to the upper area of the respective upper chambers 415 forming the actual separating zone, with the stop valves 71 to 77 being interposed between the suction line 4 and the respective separator 41 to 47.

The upper chamber 415 has a conical transition piece 417 projecting from above into a weighing container 414, with the weighing container 414 having an outlet 418 associated with a closing device 419 formed as a baffle plate and disposed below the outlet 418. The baffle plate 419 may, for example, be operated by a pneumatic swivel drive 420. As shown in the drawing, the baffle plate 419 is positioned at a distance below the outlet 418 so that the baffle plate 419 does not tightly close the outlet 418.

The separator 41, as with the separators 42 to 47, is formed by a substantially cylindrical container 421 and a cover 422 closing the top thereof, with a filter (not shown) being accommodated in the container 421. The suction line 4 (FIG. 1) is connected to the container 421 by the stop valve 71. The delivery line 61 issuing into the separating zone of the upper chamber 415 is provided with a non-return flap 423.

A lower end of the weighing container 14 is loosely inserted in a support tube 424, with the support tube 424 being, in turn, supported by a transducer 425 on a wall of the separator container 421. The transducer 425 measures the weight of material passing out of the separating zone into the weighing container 414. The baffle plate 419, closing the material outlet 418 of the weighing container 414, is located on a swivel pin 424 mounted in a lug 427 of the support tube 424. On the other side of the swivel pin the baffle plate 419 has a driving pin 428 engageable with a laterally extending fork 429, with the driving pin 428 and fork 429 forming a coupling between the swivel drive 420 and the baffle plate 419. The swivel drive 420 is located on a bracket 430, which, in turn, is fixed to the separator container 421. The coupling formed by the fork 429 and the driving pin 428 allows a free movement of the weighing container 414. A spring 431 is positioned between the driving pin 428 and the lug 427 and draws the driving pin 428 against stops in the opened and closed position of the baffle plate 419 and, consequently, maintains the baffle plate 419 in clearly defined positions.

The conveyor means functions as follows. It will be assumed that the feed container 31 of the consuming means 21 is emptied to such an extent that the pendulum flap 412 is free from the material located in the container 31 and the pendulum flap 412 passes into the closed position. It is also assumed that the consuming means 21 processes the material component in the storage container 12. Thus, the distributor 1 is set to the path reduced by broken lines shown in FIG. 1. The demand indicator 413, which responds through the closure of the pendulum flap 412, controls the swivel drive 420, which moves the baffle plate 419 into the closed position. The demand indicator 413 also opens the stop valve 71 of the separator 41, so that the vacuum builds up in the separator 41 and from their, via the delivery line 61, in the distributor 1 and the delivery line 52 until delivery starts.

The material component conveyed in the suction flow passes into the separating zone of the upper chamber 415, with the non-return flap 423 being open as a result of the vacuum, and the material is separated in the separating zone by centrifugal force and gravity and drops into the weighing container 414. Conveying continues for as long as the transducer 425 records a specific or desired weight. A corresponding setting device S in a control unit C responds and supplies a control signal to the ventilating valve 82 (FIG. 1) so that the ventilating valve 82 opens and the material still present in the delivery lines 52 and 61 passes into the separator 41 and, consequently, into the weighing container. With an empirically determined time lag, the ventilating valve 82 and the stop valve 71 are closed and the delivery cycle is ended for the consuming means 23. At the same time the baffle plate 419 is opened by the swivel drive 420, so that the material drops via the conical bottom onto the pendulum flap 14 and pendulum flap 14 opens as a result of the weight of the material. The material builds up in the feed container 31 and on the bottom 413 and maintains the pendulum flap 412 in an open position.

The consuming device processes the material in the feed container 33 in the lower chamber 416 of the separator 41 until the pendulum flap becomes free again and closes. The then responding demand indicator initiates a new delivery cycle.

In place of the described ventilating valves 81 to 86 (FIG. 1), it is preferably provided that on the distributor 1, namely on the tubular deflecting means 5 connecting the delivery lines 51 to 56 and 61 to 67, there is, at the inlet side, a single ventilating valve 6, so that only the tailings within the deflecting means 5 and within one of the delivery lines 61 to 67 passes into the separators 41 to 47. This single ventilating valve 6 is moved together with the tubular deflecting means 5, so that it is always ensured that no further product is present following a delivery cycle within the distributor 1 and the delivery line 61 to 67.

I claim:

1. Pneumatic suction conveyor means for a gravimetric dosing of different pourable materials to a plurality of demand stations, the pneumatic suction conveyor means comprising: a plurality of storage containers respectively accommodating one of said materials;

a plurality of first delivery lines respectively connecting the plurality of storage containers to a distributor;

a separator provided at each demand station for separating the respective material supplied thereto from the respective storage containers, each of said separators including an upper chamber and a lower chamber;

a closable discharge opening provided in the lower chamber of each of said separators;

a plurality of further delivery lines for respectively connecting the distributor to the upper chamber of the respective separators;

a suction line connected to a suction fan and to the upper chamber of each of said separators;

stop valve means provided at each separator for controlling communication between the suction line and the respective separators;

a weighing container disposed between the upper chamber and the lower chamber of the respective separators for receiving the material separated by the respective separators;

a transducer means for supporting said weighing container in the respective separators;

a bottom-side material outlet provided in the respective weighing containers for discharging the material separated by the respective separators into the lower chamber of the respective separators; and a closure means provided at the bottom-side material outlet of each weighing container, said closure means being responsive to a material demand indicator provided at the associated demand station so as to be brought into a closed position and being adapted to be brought into an open position when a setting device is activated by the transducer means with a set time delay.

2. Suction conveyor means according to claim 1, wherein the closable discharge opening of the respective lower chambers includes a pendulum flap adapted to be automatically closed by gravity and opened under an action of the material separated by the separator located therein, and wherein the respective demand indicators of the respective demand stations are activated in response to a closing of the respective pendulum flaps.

3. Suction conveyor means according to claim 2, wherein each of the separators is formed by a substantially cylindrical container, and wherein each of the weighing containers is concentrically inserted in the substantially cylindrical container.

4. Suction conveyor means according to claim 3, wherein each of the lower chambers has a hopper bottom inserted in the respective substantially cylindrical container, and wherein the respective pendulum flap associated with the respective lower chambers closes a lower end of the respective hopper bottoms.

5. Suction conveyor means according to one of claims 1 or 2, wherein each of the closure means includes a baffle means for holding back the material separated by the separator.

6. Suction conveyor means according to claim 5, wherein the respective baffle means is a baffle plate movable at a limited distance below the bottom-side material outlet of the respective weighing containers.

7. Suction conveyor means according to claim 6, wherein a mounting support means is provided for the respective baffle plates, and wherein the respective mounting support means are located at the bottom-side material outlet of the respective weighing containers.

8. Suction conveyor means according to claim 7, wherein drives are respectively connected with the respective baffle plates for respectively driving the respective baffle plates.

9. Suction conveyor means according to claim 8, wherein the respective drives are fixed to an interior portion of the respective separators, and wherein couplings respectively couple the respective baffle plates with the respective drives in such a manner so as not to influence the respective weighing containers.

10. Suction conveyor means according to one of claims 1 or 2, wherein the upper chamber of the respective separators comprises a separating zone, and wherein the respective weighing containers are positioned below the separating zone of the respective separators.

11. Suction conveyor means according to claim 10, wherein the separating zone of the respective separators includes a conical transition piece projecting into a top opening of the respective weighing containers.

12. Suction conveyor means according to one of claims 1 or 2, wherein the respective weighing containers are supported by the transducer means on a wall of the respective separators.

13. Suction conveyor means according to one of claims 1 or 2, wherein the distributor includes a tubular deflecting means connecting respective ones of the first delivery lines to respective ones of the further delivery lines, and wherein a single ventilating valve is positioned at an inlet of the tubular deflecting means.

* * * * *